United States Patent [19]
Sato

[11] Patent Number: 5,062,619
[45] Date of Patent: Nov. 5, 1991

[54] NON-LINEAR SPRING

[75] Inventor: Masahide Sato, Seki, Japan

[73] Assignee: Nabeya Kogyo Co., Ltd., Gifu, Japan

[21] Appl. No.: 502,489

[22] Filed: Mar. 30, 1990

[30] Foreign Application Priority Data

Apr. 3, 1989 [JP] Japan ............................. 1-39461[U]
Jul. 29, 1989 [JP] Japan ............................. 1-197408

[51] Int. Cl.$^5$ .............................................. F16F 1/02
[52] U.S. Cl. ................................ 267/154; 267/181; 267/273; 464/78
[58] Field of Search ............... 267/181, 154, 155, 156, 267/158, 165, 166, 166.1, 182, 273, 286; 474/78; 403/291

[56] References Cited

U.S. PATENT DOCUMENTS

| | | | |
|---|---|---|---|
| 1,557,958 | 10/1925 | Anderson | 464/78 |
| 1,558,576 | 10/1925 | Baumann | 464/78 |
| 1,943,942 | 1/1934 | Quintavalle | 464/78 |
| 2,171,185 | 8/1939 | Maier | 267/181 X |
| 2,343,079 | 2/1944 | Pickwell | 464/78 X |
| 2,888,258 | 5/1959 | Hoffstrom | 464/78 X |
| 3,071,941 | 1/1963 | Voihs et al. | 464/110 |
| 3,390,546 | 7/1968 | Jewell | 267/154 X |
| 3,597,938 | 8/1971 | Hellen et al. | 403/291 X |
| 3,662,648 | 5/1972 | Maillard | 267/181 X |
| 3,844,137 | 10/1974 | Zugel | 267/154 X |
| 4,690,661 | 9/1987 | Fredericks et al. | 464/78 |
| 4,826,143 | 5/1989 | Latorre et al. | 267/148 |
| 4,858,897 | 8/1989 | Irifune | 267/181 |

FOREIGN PATENT DOCUMENTS

| | | | |
|---|---|---|---|
| 2501397 | 11/1975 | Fed. Rep. of Germany | 267/181 |
| 1090004 | 7/1953 | France | 267/181 |
| 2271452 | 12/1975 | France | 267/181 |
| 58-49732 | 11/1983 | Japan . | |
| 2193290 | 2/1988 | United Kingdom | 267/181 |
| 8801026 | 2/1988 | World Int. Prop. O. | 464/78 |

Primary Examiner—Douglas C. Butler
Attorney, Agent, or Firm—Jordan and Hamburg

[57] ABSTRACT

A spring given elasticity by way of elastic portions formed between slits which are provided on a base material of, e.g. solid cylindrical shape, cylindrical pipe shape, etc. The slits are formed on an outer peripheral surface of the base material at different phase angles. They are arranged along the length of the material and parallel to each other. The elastic portions are disposed at different pitches along the length so that some of them have different elasticity from the others. The elasticity between some portions and the others may be varied by way of changing an inner diameter of a through hole formed in the spring. Thereby the spring has non-linear elasticity characteristics. The spring may have a through hole and a line of slit spirally extending about the axis and communicating with the through hole. A line of elastic portion is defined by the slit and also extends spirally about the axis of the spring. The width of the elastic portion is changed along the axis of the spring.

7 Claims, 4 Drawing Sheets

NON-LINEAR SPRING

The present invention relates generally to a spring and its manufacturing method, particular to a spring and its manufacturing method in which slits are formed on a block of base material.

BACKGROUND OF THE INVENTION

In general, a linear member as a base material is wound spirally to form a coil spring. In producing springs with non-linear elasticity characteristics, winding pitches and diameters of the linear member are changed according to the characteristics desired. However, this work is time-consuming and manufacturing costs will increase, so that product prices of the springs are pushed high.

On the other hand, when the spring is used as a tension spring and/or a torsion spring, its ends are bent in U-shape to form a hook, which is hooked or attached to an object. But, with this way of hooking, when a heavy load is applied to the hook, it might be unable to bear the load and be broken.

A flexible coupling, though not a spring, is discosed in Japanese Patent Publication No. 58-49732 which was laid open on Apr. 9, 1975, and announced to be granted on Nov. 7, 1983. It corresponds to U.S. Pat. No. 3,844,137. The coupling has the same operation as a spring in that both of them have elasticity. The coupling comprises a plurality of pairs of slits which are formed into a cylindrical main body. They have depths larger than the radius of the main body. They are arranged at the same pitch along the axis of the main body. Plate spring portions are defined respectively between one pair of the slits, respectively, and have the same width. Each pair has two slits extended in parallel with each other and from the opposite directions. The extending directions of each pair are shifted at the angle of 90 degrees compared with those of the adjacent pair.

SUMMARY OF THE INVENTION

It is a primary objective of the present invention to provide a spring which has non-linear elasticity characteristics and is easily manufactured to lower the product prices, and its manufacturing method.

It is another objective of the present invention to provide a spring which can be firmly attached to an object and has its fitting portion strong enough to bear a large load and be prevented from breaking.

In order to achieve the above and other objectives, in accordance with the first aspect of the present invention, a spring with a length is disclosed that has a plurality of slits formed thereon. The slits are placed at longitudinally different positions. They extend from the outer peripheral surface to the inside while substantially in parallel to one another. A plurality of elastic portions are defined between two adjacent slits, respectively. Some of the elastic portions have a elastic coefficient different from that of the others so that the spring has non-linear elasticity characteristics.

The spring may have a solid cylindrical shape. A fitting portion attachable to an object may be integrally formed at one longitudinal end thereof. The spring also may have a polygonal shape and one longitudinal end thereof be inserted into and engaged with a recess which is formed on an object while being restricted from rotation relative to the object.

Also, each slit may be composed of a pair of slitting portions which extend from opposite surfaces toward the axis of the spring in the same plane substantially orthogonally crossing the axis. They communicate with each other near the axis. In the same plane, a pair of connecting portions may be arranged, at a border of the two slitting portions of the pair, on the outer periphery of the spring in order to connect the adjacent elastic portions.

A method for manufacturing a spring in accordance with the present invention comprises a first step for making a metal slitting saw cut into a base material from a first outer surface toward an axis thereof, in a plane substantially orthogonally crossing the axis. In the first step, the metal slitting saw is stopped at a first radial position beyond the axis. It has a second step for making the metal slitting saw cut into the base material from a second outer surface, which is opposite to the first outer surface, toward the axis thereof, in the same plane. In the second step, the metal slitting saw is stopped at a second radial position beyond the axis. Thus, a pair of slitting portions are formed and communicate each other near the axis while a pair of connecting portions are formed, at a border of the two slitting portions of the pair, on an outer periphery of the base material. In a third step, the metal slitting saw has its cutting position transposed along the axis of the base material relative thereto. The above first to third steps, are repeated so that a plurality of elastic portions are defined between the slitting portions and connected by the connecting portions.

A spring is disclosed, according to a second aspect of the present invention, that has a cylindrical shape with a through hole extending along its axis. A line of slit extends spirally about the axis and communicates with the through hole. An elastic portion is defined by the slit and also extend spirally about the axis. The width of the elastic portion changes along the axis.

A spring is disclosed, according to a third aspect of the present invention, that comprises a plurality of slits cut into the spring from an outer peripheral surface to an inside thereof. A plurality of elastic portions are defined by the slits so that some of them have an elasticity coefficient different from that of the others, whereby the spring have non-linear elasticity characteristics.

Other and further objectives of the present invention will become apparent with an understanding of the embodiments discussed later, and the appended claims. Further, many advantages not mentioned in this specification will become obvious to one skilled in the art upon application of the present invention.

DETAILED DESCRIPTION OF THE PREFERRED EMBODIMENTS

A spring of a first embodiment of the present invention will be described hereafter referring to FIGS. 1 to 4.

Figure 1:
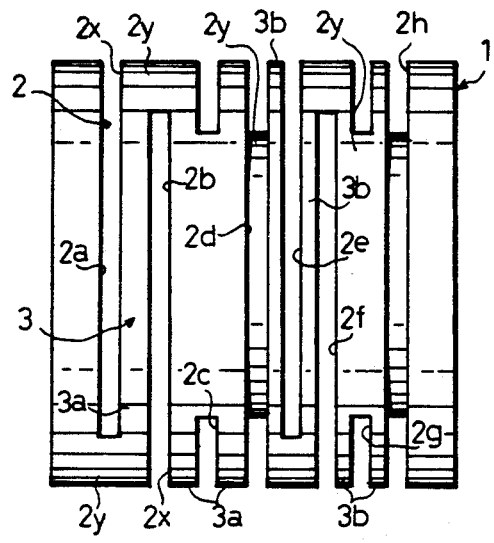
FIG. 1 is a front view showing a spring of a first embodiment of the present invention.

As shown in FIG. 1, a spring 1 made from aluminum has a solid cylindrical shape. A plurality of slits 2 are formed on the spring 1 and extend in the radial direction. They are parallel to each other and arranged along the axis of the spring 1. They may be made by cutting operation of a metal slitting saw. Phases of first and second slits 2a and 2b are shifted 180 degrees in angle to each other. Phases of third and fourth slits 2c and 2d, fifth and sixth slits 2e and 2f, seventh and eighth slits 2g and 2h are respectively shifted 180 degrees to each other as well. On the other hand, phases of the second and third slits 2b and 2c are shifted 90 degrees to each other. Phases of the fourth and fifth slits 2d and 2e, and the sixth and seventh slits 2f and 2g are also respectively shifted 90 degrees to each other.

Each slit 2 extends deeply in the radial direction, from one end (an opening 2x) to the other end (a closed portion 2y), and crosses the axis of the spring 1. An elastic portion 3 of thin plate is defined between two adjacent slits 2, respectively. Two adjacent elastic portions 3 are connected to each other by means of one of the closed portions 2y. Widths of the slits 2 are all set the same, but pitches of the first to fourth slits 2a to 2d are set larger than those of the fourth to eighth slits 2d to 2h. Accordingly, each of left side elastic portions 3a formed between the first to fourth slits 2a to 2d is thicker than each of right side elastic portions 3b formed between the fourth to eighth slits 2d to 2h. As a result, the right side elastic portions 3b deflect more easily than the left side elastic portions 3a. When external force is applied to the spring 1, the right side elastic portions 3b deflect first so as to change the widths of the slits 2d to 2h. The left side elastic portions 3a begin deflecting to change the widths of the slits 2a to 2c when the right side elastic portions 3b stops deflecting any more after superceding the critical point of deflection. The force required to elastically deform the spring 1 is small at first, and becomes large thereafter. Consequently, the relationship does not change linearly between the external force applied to the spring 1 and the distortion factor thereof, so that its elasticity characteristics become non-linear.

There will be described operations of the spring 1 constructed as above wherein various kinds of external force are applied thereto.

Figure 2:
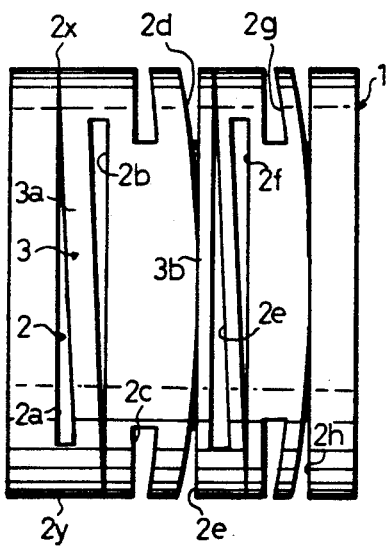
FIG. 2 is a front view showing the spring to which a compressive force has been applied.

As shown in FIG. 2, when compressive force is applied to the spring 1 in the axial direction thereof, the right side elastic portions 3b are deformed first and make the intervals therebetween or the widths of the slits 2d to 2h narrower gradually at the openings 2x than at the closed portions 2y. Then, the left side portions 3a are distorted to narrow the slits 2a to 2c after the right side elastic portions 3b come to be no more distorted beyond the critical point of distortion. Thereby, the spring 1 as a whole is compressed in the axial direction. In this case, the spring 1 operates as a compression spring.

Figure 3:
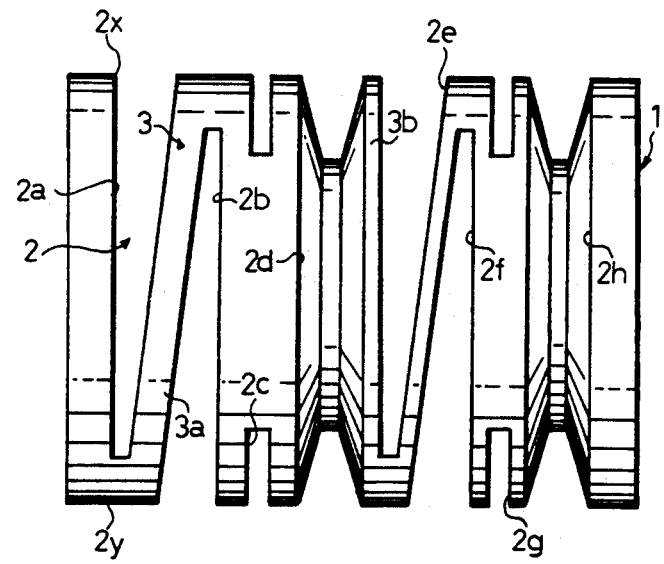
FIG. 3 is a front view showing the spring to which a tensile force has been applied.

On the contrary, as shown in FIG. 3, when tensile force is applied to the spring 1 in the axial direction thereof, the right side elastic portions 3b are deformed first and make the intervals therebetween or the widths of the slits 2d to 2h wider gradually at the openings 2x than at the closed portions 2y. Then, the left side portions 3a are distorted to widen the slits 2a to 2c after the right side elastic portions 3b come to be no more distorted beyond the critical point of distortion. Thereby, the spring 1 as a whole is elongated in the axial direction. In this case, the spring 1 operates as a tension spring.

Figure 4:
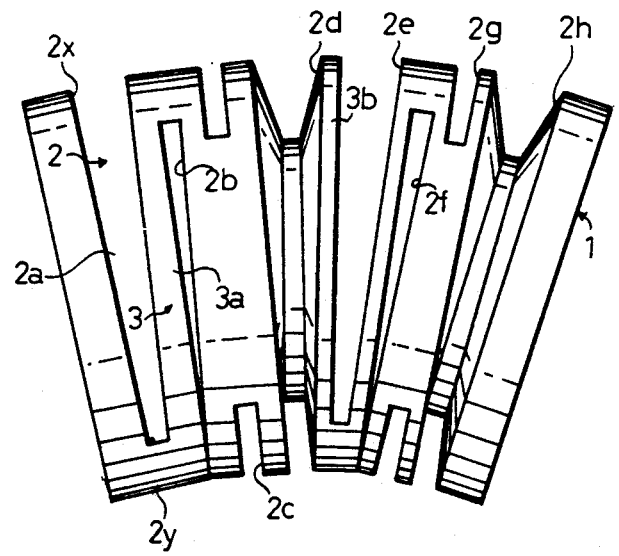
FIG. 4 is a front view showing the spring to which a bending force has been applied.

On the other hand, as shown in FIG. 4, when bending force is applied to both ends of the spring 1, the right side elastic portions 3b are deformed first and make the intervals therebetween or the widths of the slits 2d to 2h wider gradually at the upper portion than at the lower portions. Then, the left side portions 3a are distorted to widen the slits 2a to 2c after the right side elastic portions 3b come to be no more distorted beyond the critical point of distortion. Thereby, the spring 1 as a whole is bent in the radial direction. In this case, the spring 1 operates as a bend spring.

In addition, though not shown in the drawings, when torsional force is applied to twist both ends of the spring 1 in circumferentially opposite directions, the right side elastic portions 3b are deformed first to change the intervals therebetween or the widths of the slits 2d to 2h. Then, the left side portions 3a are distorted to change the widths of the slits 2a to 2c after the right side elastic portions 3b come to be no more distorted beyond the critical point of distortion. Thereby, the spring 1 as a whole is twisted in the circumferential direction. In this case, the spring 1 operates as a torsion spring.

As described above, the spring 1 of the present embodiment can be produced only by forming the slits 2 via cutting operation, so that its manufacturing work is very easy. Elastic strength of the elastic portions 3 is easily varied by changing the pitches of the slits 2 or the diameter of the spring 1. Therefore, the elasticity coefficient of the spring 1 can be optionally set. For instance, if the pitches of some of the slits 2 are made larger, the elastic portions which correspond to these become thicker. Thus, these elastic portions 3 are made harder to be distorted, so that there is easily provided a spring which has non-linear elasticity characteristics with high elasticity coefficient at those elastic portions 3. Namely, the elasticity characteristics of the spring 1 become non-linear only by changing the pitches of the slits 2.

In addition, it is very easy to manufacture the spring 1, since it is able to be produced only by cutting a base material of solid cylindrical shape.

The spring 1 of the first embodiment is made of the base material of solid cylindrical shape. However, for example, another spring can be produced by forming slits on a base material of cylindrical shape with a through hole. In this case, a cutting amount for making the slits become less by the extent of the through hole, so that this manufacturing work is much easier.

Figure 5:
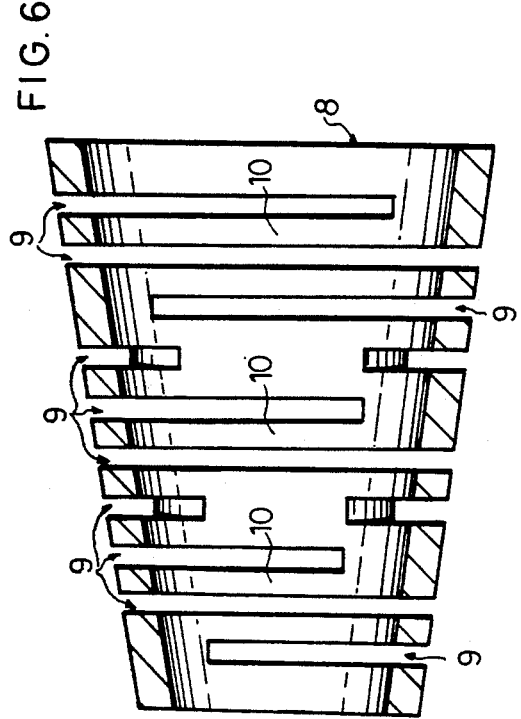
FIG. 5 is a front view showing a modification of the spring of the first embodiment.

The spring 1 of the first embodiment has the pitches of slits 2 changed. Besides, as shown in FIG. 5, it may have two kinds of through holes 7a and 7b of different diameters while having the same pitches of slits 2. These holes 7a and 7b extend along the axis and communicate with each other. Thus, the wall thickness of the elastic portions 6a at one side (right side in FIG. 5) is smaller than that of the elastic portions 6b at the other side (left side in FIG. 5).

In this case, the elastic portions 6a are easier to be distorted because of the smaller thickness than the other elastic portions 6a that have large thickness. As a result, the elastic characteristics of the spring 1 become non-linear.

Figure 6:
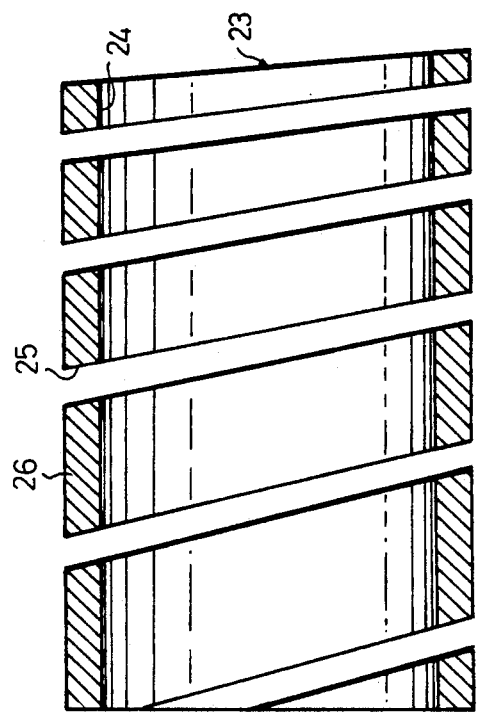
FIG. 6 is a sectional view showing another modification of the spring of the first embodiment.

A spring 8 shown in FIG. 6 has a truncated cone pipe shape. It has elastic portions 10 with the same wall thickness. Pitches of slits 9 are fixed. In this case, the elastic portions 10 with larger diameter are easier to be distorted. Thus, the elasticity characteristics of the spring 8 is non-linear.

Figure 7:
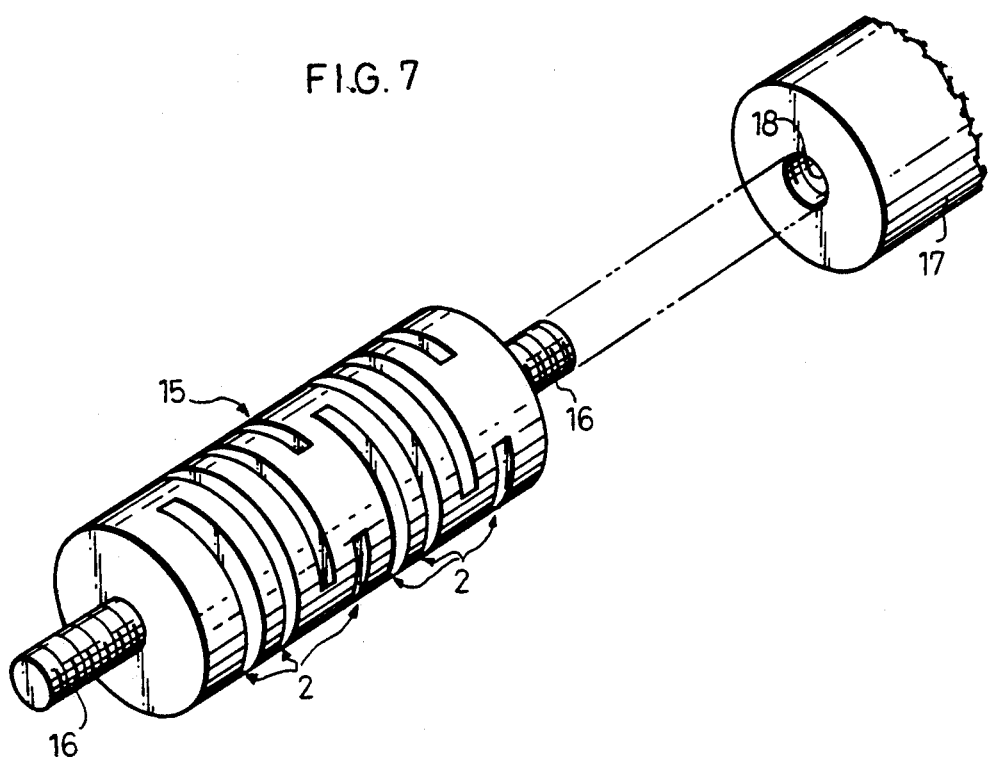
FIG. 7 is a perspective view showing a spring of a second embodiment of the present invention together with a movable member.

A spring of a second embodiment of the present invention will be described with reference to FIG. 7.

A spring 15 of the second embodiment is produced by forming external threads 16 integrally at both ends of the spring 1 of the first embodiment. The external threads 16 constitute fitting portions.

The spring 15 is disposed between a pair of movable members 17, only one of which is shown. These two members are adapted to approach and separate each other. The spring 15 has both the external threads 16 inserted and fitted into internal threads 18 of the movable members 17 so as to serve to buffer the approaching and separating motion of the movable members 17.

As described above, the external threads 16 are formed integrally with the spring 15 in order to connect and fix the spring 16 and movable members 17 to each other. Therefore, the external threads 16 are hard to break even when a large load is applied to the spring 15. Also, it is easily and surely realized to connect and fix the spring 15 and movable members 17 to each other.

In the second embodiment, the external threads are provided on the spring 15 while the internal threads 18 are provided on the movable members 17. Besides, internal threads may be arranged on a spring while external threads be disposed on movable members. Further, only one external thread may be provided on one end of a spring as desired.

Figure 8:
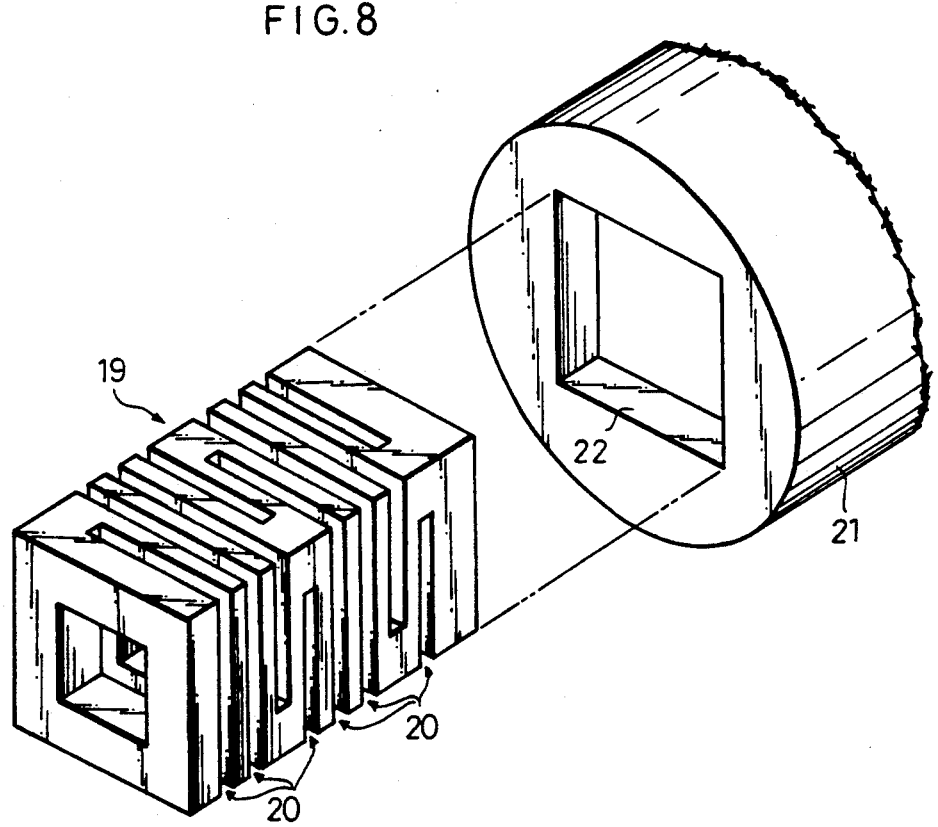
FIG. 8 is a perspective view showing a spring of a third embodiment of the present invention together with another movable member.

A spring of a third embodiment of the present invention will be described with reference to FIG. 8.

A spring 19 has the same structure as the spring 1 of the first embodiment except that it has a square pipe shape. Slits 20 have the same pitches and widths as the slits 2 of the first embodiment. The spring 19 is manufactured by cutting a base material of square shape with a length on which the slits 20 have been previously formed.

The spring 19 of the third embodiment is disposed between a pair of movable members 21, only one of which is illustrated. They are arranged at a predetermined interval and reciprocally rotated in opposite directions to each other about their axis of them. The spring 19 has both ends inserted into and engaged with engaging recesses 22 of square shape formed on the movable members 21, respectively, so as to serve to buffer reciprocating rotation thereof.

As described above, the spring 19 of the third embodiment can be firmly fitted to the movable members 21 only by inserting and engaging the ends into the engaging recesses 22 of the movable members 21, while being prevented from rotating relative thereto. Thus, the spring 19 is hard to break at the ends thereof. In addition, it is easy to manufacture the spring 19, because it is carried out only by cutting the base material of square pipe shape. A through hole of square shape may be made on each of the movable members 21 instead of the engaging recesses 22 so that the both ends of the spring 19 be inserted and fitted thereinto. Moreover, the spring may have a triangular or hexagonal pipe shape, and engaging recesses may have shapes corresponding thereto.

The springs 1, 4, 8, 15 and 19 in the first to third embodiments have the phase angles of the slits 2, 5, 9 and 20 set at 90 degrees or 180 degrees. However, these phase angles may be optionally changed as desired.

Figure 9:
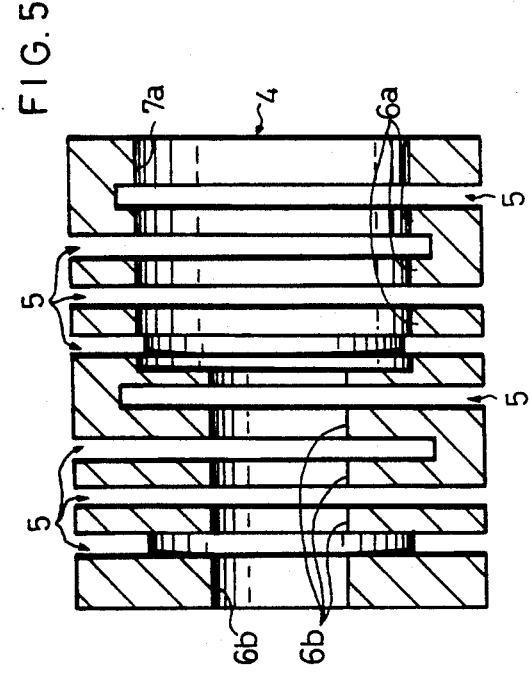
FIG. 9 is a front view showing a spring of a fourth embodiment of the present invention.
Figure 10:
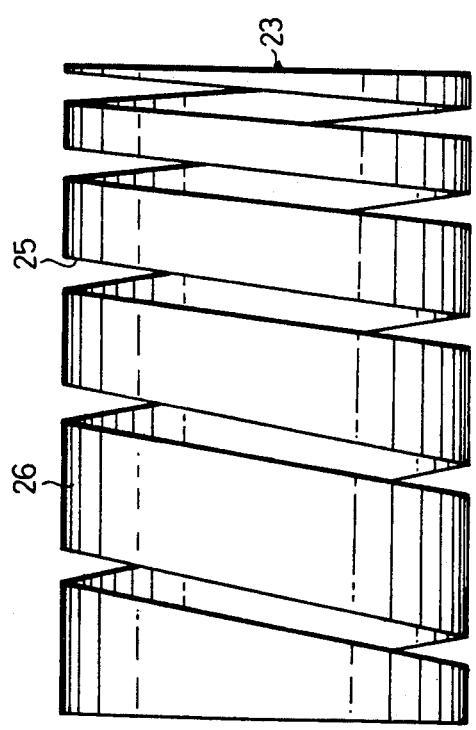
FIG. 10 is a cross sectional view of the spring.

A fourth embodiment of the present invention will be described with reference to FIGS. 9 and 10.

A spring 23 is made of aluminum and has a cylindrical shape with a through hole 24 extending along its axis. A slit 25 of constant width is formed on the spring 23 and extends spirally about the axis of the spring 23. It communicates with the through hole 24. A continuous elastic portion 26 is defined by the slit 25 and extends also spirally about the axis of the spring 23. Pitches of the slit 25 are made smaller at the right end than at the left end of the spring 23 in FIGS. 9 or 10. Thus, the elastic portion 26 is easier to be distorted at the right end.

When various external forces in the first embodiment are applied to the spring 23 constructed as above, the elastic portion 26 starts being elastically deformed from the right end which has a smaller width. The deformed portion moves to the left step by step, whereby the right side of the elastic portion 26 stops being distorted. Thus, the force necessary for elastically deforming the spring 23 is small at first, but becomes greater gradually. As a result, the relationship does not change linearly between the external force applied to the spring 23 and the distortion factor thereof. In other words, the elastic characteristics can be non-linear only by optionally changing the pitches of the slit 25. The elasticity characteristics can be easily varied.

The spring 23 of the fourth embodiment has the pitches of slit 25 changed along the axis. However, the width of the elastic portion may be changed, e.g. by changing the width of the slit while the pitches of slit remain the same.

Figure 11:
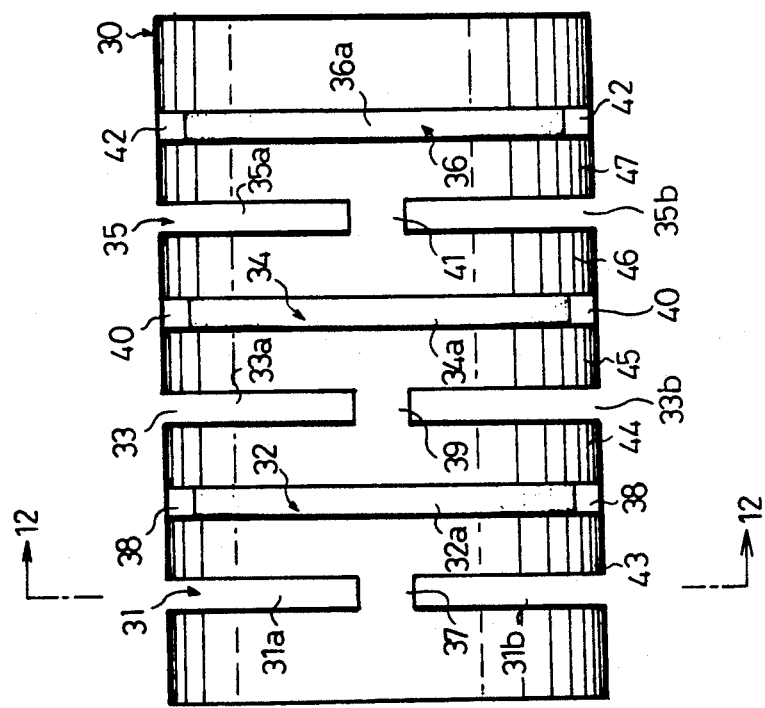
FIG. 11 is a front view showing a spring of a fifth embodiment of the present invention.

A spring of a fifth embodiment of the present invention will be described with reference to FIGS. 11 and 12.

A spring 20 is made of aluminum and has a solid cylindrical shape. A plurality of slits 31 to 36 are formed on the spring 30, for instance by cutting operation of a metal slitting saw C. They extend in the radial direction and are parallel to each other. They are also arranged along the axis of the spring 30 at a predetermined interval. Each of the slits 31 to 36 comprises a pair of slitting portions 31a and 31b, 32a and 32b, 33a and 33b, 34a and 34b, 35a and 35b, and 36a and 36b. Each pair are formed from opposite directions with the axis therebetween in a plane orthogonally crossing the axis. Namely, the phases of the slitting portions in each pair are shifted 180 degrees in angle. The two slitting portions in the pair communicate with each other near the axis of the spring 30. The phases of the adjacent pairs are shifted 90 degrees to each other.

Elastic portions 43 to 47 of disc shape are formed between two adjacent slits 31 to 36, respectively. Widths of the elastic portions 43 to 47 and pitches of the slits 31 to 36 are so set as to make non-linear the elasticity characteristics of the spring as a whole. Two adjacent ones of the elastic portions 43 to 47 are connected with each other by means of each pair of connecting portions 37 to 42, which are formed at both ends of a border between each pair of slitting portions 31a to 36b. When an external force is applied to the spring 30, each of the elastic portions 43 to 47 is elastically distorted.

A manufacturing method of the spring 30 will be described hereafter.

Figure 12:
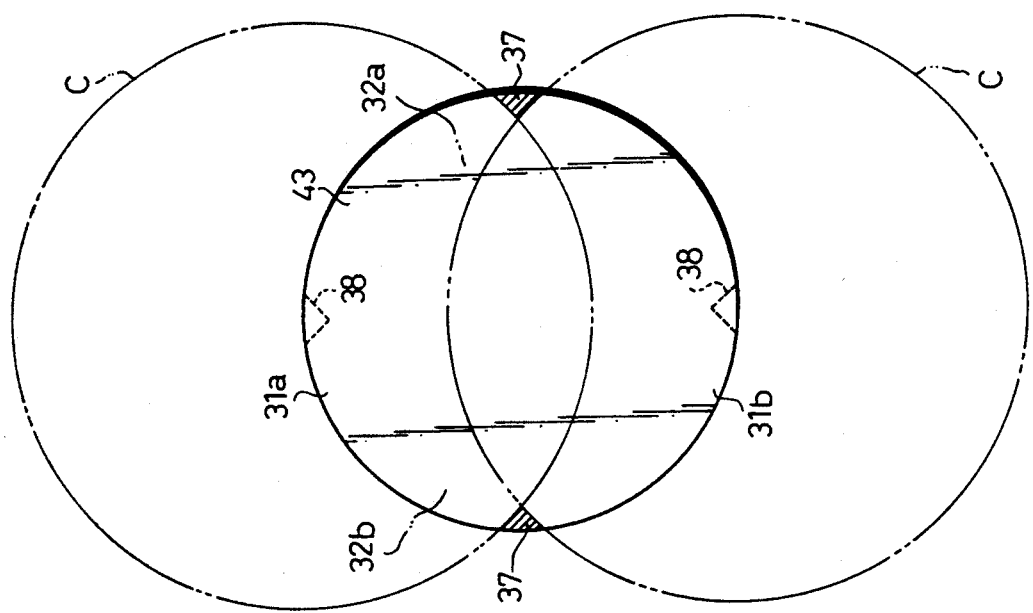
FIG. 12 is a cross sectional view taken along the line 12—12 of FIG. 11.

First, as shown in FIG. 12, a base material of solid cylindrical shape is placed horizontally. Then, the metal slitting saw C of disc shape is cut into the base material from one outer peripheral surface toward the axis thereof. It is stopped at a position (shown by a two dot chain line at the upper side of FIG. 12) where a tip of the metal slitting saw C goes a little beyond the axis of the base material. Thus, the slitting portion 31a is formed at one side of the material with an arc shape inside the material. Second, the positioning relationships are changed between the base material and the metal slitting saw C. Then, an other outer peripheral surface, which is opposite to the one peripheral surface in the cutting of the slitting portion 31a, is moved to face the metal slitting saw C. Thereafter, the metal slitting saw C is operated to cut into the base material from the other peripheral surface toward the axis thereof. The saw C is stopped at a position (shown by another two dot chain line at the lower side of FIG. 12) where a tip of the metal slitting saw C goes a little beyond the axis of the base material. The slitting portion 31b is thus formed in the same plane as the slitting portion 31a thereby constituting a pair. Thereby, a pair of connecting portions 37 are left without being cut, so that the first slit 31 is formed.

Then, the metal slitting saw C is transposed a fixed distance along the axis from the first slit 31 to a position to be cut next. For example, it is moved rightward in FIG. 11. The saw C is then shifted 90 degrees in angle from the first slit 31 and cut into the base material at that position in the same manner as the formation of the first slit 31. Thus the slitting portion 32a is formed. Then, the metal saw C is again cut into the base material from the opposite side to the slitting portion 32a, thereby making the slitting portion 32b. Thus, the second slit 32 is formed while a pair of second connecting portions 39 to 42 remain uncut. In the same way as above, the third to sixth slits 33 to 36 and the third to sixth connecting portions 39 to 42 are formed. According to the above operation, the elastic portions 43 to 47 are formed between the slits 31 to 36, thus completing the manufacturing the spring 30.

As described above, the spring 30 of the fifth embodiment is able to be easily manufactured only by forming the slits 31 to 36 with cutting operations as in the first embodiment.

Elastic strength of the elastic portions 43 to 47 is changed as the pitches of the slits 31 to 36 and the dimaters of the spring 30 are changed. So the elasticity characteristics of the spring 30 can be easily changed corresponding to conditions required in desired cases.

A material of the springs 1, 4, 8, 15, 19, 23 and 30 of the above embodiments is not limited to aluminum, but for instance steel, synthetic resin or the like may be used.

The springs 1, 4, 8, 15, 19, 23 and 30 may also be used in a variety of machines or apparatus, e.g. cutting machines, measuring machines, etc. Besides, they may be applicable to, for example, signets. In this application, slits like those of the first embodiment are made at the perimeter near a pressing surface where a seal impression is formed. With this signet, elastic portions defined between the slits are deformed at use when the surface is not parallel to a paper surface. Thus, the signet is always able to get the pressing surface to come into firm contact with a paper surface thereby making a clear seal impression.

As many apparently widely different embodiments of this invention may be made without departing from the spirit and scope thereof, it is to be understood that the invention is not limited to the specific embodiments thereof except as defined in the appended claims.

What is claimed is:

1. A spring comprising:
   an elongated spring body having a longitudinal axis;
   a plurality of substantially parallel slits extending laterally through the spring body, each said slit extending more than half way through the spring body, the slits being arranged in sets, each set having at least two pairs of slits oriented at different phase angles, wherein the individual slits in each slit pair are angularly displaced substantially 180° relative to one another; and
   a plurality of elastic portions respectively defined between adjacent slits, wherein the thicknesses of the elastic portions in a first set is different from the thicknesses of the elastic portions in a second set to provide the spring with a non-linear elasticity characteristic.

2. A spring as recited in claim 1, wherein within each set, the orientation of a first pair of said slits is angularly displaced substantially 90° relative to a second pair of said slits.

3. A spring as recited in claim 1, wherein the thicknesses of the elastic portions formed between the slits in each particular set of slits are the same.

4. A spring as recited in claim 1, wherein the spring body is formed from a tubular member.

5. A spring as recited in claim 4, wherein said spring body is substantially cylindrical.

6. A spring as recited in claim 4, wherein said spring body has a substantially rectangular cross-section.

7. A spring comprising:
   an elongated spring body having a longitudinal axis;
   a plurality of substantially parallel slits extending laterally through the spring body, each said slit extending more than half way through the spring body, the slits being arranged in at least two sets of at least four slits oriented at different phase angles the four slits within each set being oriented at substantially 90° intervals; and
   a plurality of elastic portions respectively defined between adjacent slits, wherein the thicknesses of the elastic portions formed between the slits in each particular set of slits are the same, and wherein the thicknesses of the elastic portions formed between the slits in a first set of slits are different from the thicknesses of the elastic portions formed between the slits in a second set of slits to provide the spring with a non-linear elasticity characteristic.

* * * * *